United States Patent
Kobayashi et al.

(10) Patent No.: US 9,926,101 B2
(45) Date of Patent: Mar. 27, 2018

(54) LAMINATED MATERIAL FOR PAPER CONTAINERS AND PAPER CONTAINERS USING IT

(71) Applicants: NAKAMOTO PACKS CO., LTD., Osaka-shi, Osaka (JP); MIKUNISHIKO CO., LTD., Tondabayashi-shi, Osaka (JP)

(72) Inventors: Yukio Kobayashi, Tokyo (JP); Hitoshi Sasaki, Kawasaki (JP); Katsuro Sasauchi, Osaka (JP); Shingo Abe, Tondabayashi (JP); Yoshiyuki Koizumi, Tondabayashi (JP)

(73) Assignees: NAKAMOTO PACKS CO., LTD., Osaka-shi (JP); MIKUNISHIKO CO., LTD., Tondabayashi-shi (JP)

( * ) Notice: Subject to any disclaimer, the term of this patent is extended or adjusted under 35 U.S.C. 154(b) by 116 days.

(21) Appl. No.: 14/385,437

(22) PCT Filed: Oct. 7, 2013

(86) PCT No.: PCT/JP2013/005950
§ 371 (c)(1),
(2) Date: Sep. 15, 2014

(87) PCT Pub. No.: WO2015/052741
PCT Pub. Date: Apr. 16, 2015

(65) Prior Publication Data
US 2016/0075468 A1    Mar. 17, 2016

(51) Int. Cl.
*B65D 5/56* (2006.01)
*B32B 27/10* (2006.01)
(Continued)

(52) U.S. Cl.
CPC .............. *B65D 5/563* (2013.01); *B32B 7/12* (2013.01); *B32B 15/08* (2013.01); *B32B 15/20* (2013.01);
(Continued)

(58) Field of Classification Search
CPC .......... B65D 5/563; B65D 5/566; B32B 7/12; B32B 15/08; B32B 15/20; B32B 27/08; B32B 27/10; B32B 27/36
See application file for complete search history.

(56) References Cited

U.S. PATENT DOCUMENTS

| 5,433,982 A | 7/1995 | Yamada et al. |
| 2005/0067127 A1 | 3/2005 | Frisk et al. |

(Continued)

FOREIGN PATENT DOCUMENTS

| CN | 102896857 A | 1/2013 |
| EP | 0 930 155 A1 | 7/1999 |

(Continued)

OTHER PUBLICATIONS

Machine translation of JP 2000-062123. Feb. 2000.*

(Continued)

*Primary Examiner* — John E Uselding
(74) *Attorney, Agent, or Firm* — Birch, Stewart, Kolasch & Birch, LLP

(57) ABSTRACT

Provided is a paper container for foods capable of being fabricated by heat sealing which does not absorb flavors, such as limonene, and capable of storing a long period at ordinary temperature. The laminated material for paper containers is composed of paper substrate layer/adhesive for paper layer/first adhesive for barrier layer/barrier layer/second adhesive for barrier layer/heat-sealable PET resin layer, has an oxygen gas barrier ability of 2.0 ml/m²·D·atm or less, and the heat-sealable PET resin layer is made having (Continued)

a crystal portion of less than 15%, non-crystal portion of 85% or more.

9 Claims, 2 Drawing Sheets

(51) Int. Cl.
| | |
|---|---|
| *B32B 27/36* | (2006.01) |
| *B32B 7/12* | (2006.01) |
| *B32B 15/20* | (2006.01) |
| *B32B 27/08* | (2006.01) |
| *B32B 27/30* | (2006.01) |
| *B32B 27/34* | (2006.01) |
| *B32B 15/08* | (2006.01) |
| *B32B 29/06* | (2006.01) |

(52) U.S. Cl.
CPC .............. *B32B 27/08* (2013.01); *B32B 27/10* (2013.01); *B32B 27/302* (2013.01); *B32B 27/304* (2013.01); *B32B 27/306* (2013.01); *B32B 27/308* (2013.01); *B32B 27/34* (2013.01); *B32B 27/36* (2013.01); *B32B 29/06* (2013.01); *B65D 5/566* (2013.01); *B32B 2255/20* (2013.01); *B32B 2255/26* (2013.01); *B32B 2307/306* (2013.01); *B32B 2307/31* (2013.01); *B32B 2307/704* (2013.01); *B32B 2307/7244* (2013.01); *B32B 2307/7265* (2013.01); *B32B 2439/00* (2013.01); *B32B 2439/40* (2013.01); *B32B 2439/70* (2013.01)

(56) References Cited

U.S. PATENT DOCUMENTS

| | | | |
|---|---|---|---|
| 2008/0070770 | A1 | 3/2008 | Magnusson et al. |
| 2011/0221097 | A1* | 9/2011 | Sasauchi ................... B32B 1/02 |
| | | | 264/331.21 |

FOREIGN PATENT DOCUMENTS

| | | | |
|---|---|---|---|
| JP | 2000-62123 | A | 2/2000 |
| JP | 3007408 | B2 | 2/2000 |
| JP | 2001-322624 | A | 11/2001 |
| JP | 2004-338773 | A | 12/2004 |
| JP | 2012-20769 | A | 2/2012 |
| JP | 2012-66506 | A | 2/2012 |
| JP | 2012-066506 | A | 4/2012 |
| JP | 60-250950 | A | 4/2013 |
| JP | 5180272 | B2 | 4/2013 |

OTHER PUBLICATIONS

Machine translation of JP 60-250950. Dec. 1985.*
Extended European Search Report dated Apr. 15, 2016, in European Patent Application No. 13879669.3.

* cited by examiner

[Fig. 1]
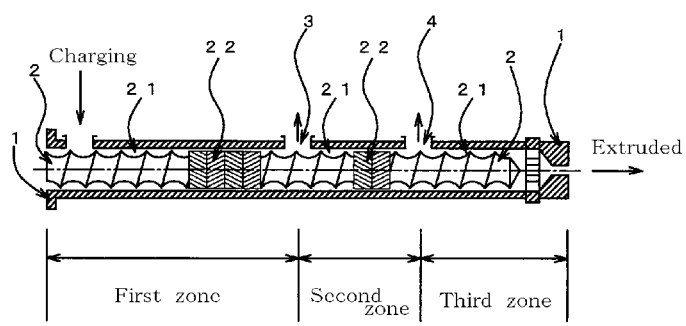
[Fig. 2]
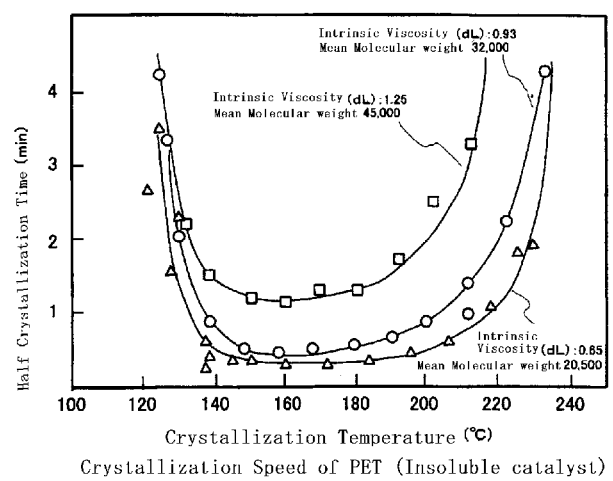

[Fig. 3]
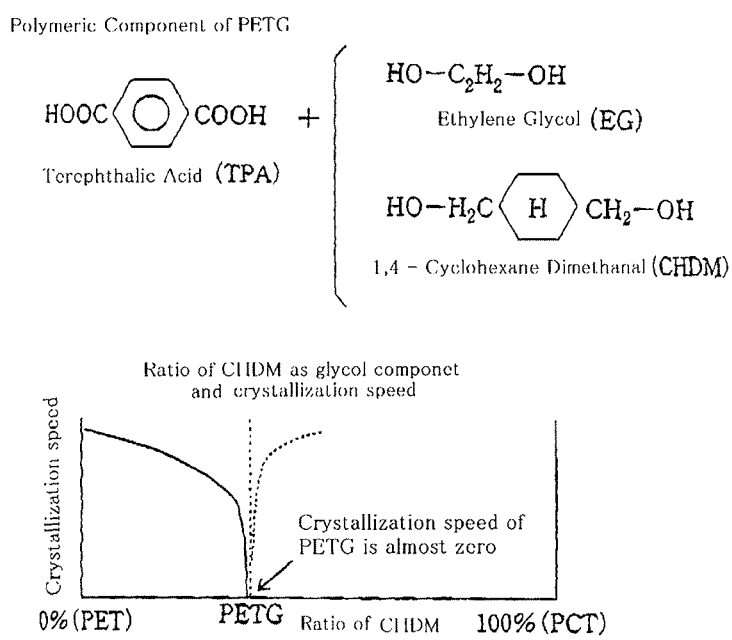
[Fig. 4]
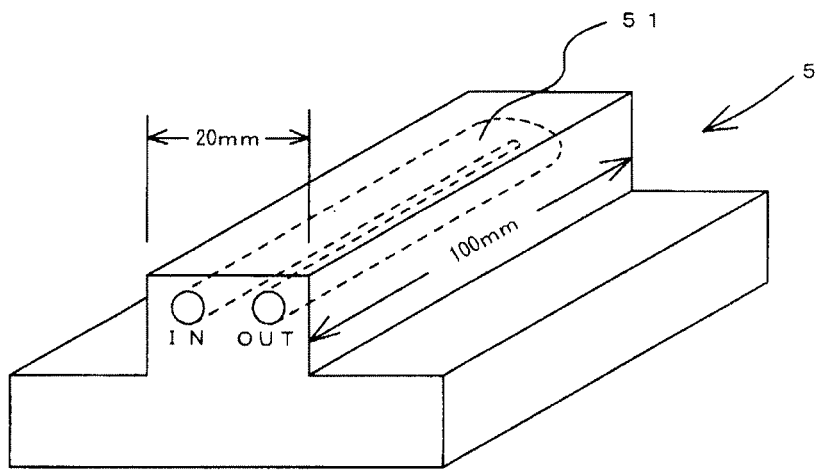

LAMINATED MATERIAL FOR PAPER CONTAINERS AND PAPER CONTAINERS USING IT

TECHNICAL FIELD

This invention relates to a laminated material for paper containers and a paper container made of it, and more particularly, relates to a paper container wherein heat-sealing ability necessary for fabricating into the paper container is imparted by disposing a PET resin layer, which has good flavor-keeping quality, as the inner surface resin layer which is laminated to paper, and long-term keeping quality at ordinary temperature is improved by disposing a barrier layer as an intermediate layer.

BACKGROUND ART

At present, a great number of paper containers are used for beverages, such as vegetable juice, milk, yogurt, Japanese tea and coffee, alcoholic drinks, such as sake and Japanese spirits, liquid seasonings, such as sauce for noodles and soy sauce, cups, such as for instant noodles and for ice cream, and the like. Laminates for paper containers are frequently used for the paper containers, wherein a polyolefin resin layer, particularly, a polyethylene resin layer is laminated as the inner surface layer for imparting water resistance and for facilitating fabrication into the paper container by heat sealing. However, polyethylene resin has a problem of adsorbing flavor components represented by d-limonene to lose flavor-keeping, and therefore, they could not be used for beverages to which flavor-keeping is important.

Incidentally, PET resin is a most common resin not to adsorb flavor components which is inexpensive, and it is used for fruit juice drinks as PET bottles. However, since PET resin is a crystalline resin, it could not be used as it is due to its poor low temperature heat sealability which is necessary for fabricating paper containers.

Thereupon, several techniques have been proposed to blend polyethylene with polyester made of terephthalic acid and isophthalic acid and ethylene glycol (see Patent Document 1), to use non-crystallin-low crystalline modified polyethylene terephthalate having a glass transition point of 40° C. or more (see Patent Document 2), or to use a polyester consisting of 97-50 parts by weight of copolyester, wherein 50 mol. % or more of dicarboxylic acid component is terephthalic acid and diol component is composed of 40-90 mol. % of ethylene glycol and 10-60 mol. % of ethylene oxide adduct of a bisphenol, and 3-50 parts by weight of epoxy group-containing ethylene-based copolymer (see Patent Document 3).

However, the technique proposed in the above Patent Document 1 has a problem to lack a low temperature heat sealability (around 130° C.) comparable to polyethylene resin, and moreover, it is possible to adsorb flavors according to the blended volume of the polyethylene resin due to blending it. The techniques proposed in the above Patent Documents 2 and 3 have a problem that the resin employed is not a commonly produced PET resin, but is needed to be newly synthesized, and therefore, increases cost.

Then, the applicant has proposed laminated material for paper containers and a paper container using it which have solved the above problems (see Patent Document 4). The laminated material for paper containers and the paper container using it are manufactured by adding a chain extender composed of styrene-methyl (metha) acrylate-glycidyl methacrylate to PET resin having an intrinsic viscosity of 0.55-0.7 dl/g, charging the mixture to an extruder having two or more vent holes, sucking to degas with a high vacuum of −750 mmHg or more from the vent holes under heating to melt conditions of the PET resin, and thereby extrusion properties are improved, then extruding to laminate a PET resin layer on a paper layer, and immediately after laminating, cooling rapidly the face of the PET resin layer by a cooling roll, and the resulting PET resin layer has a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100$$

[Mathematical 1]

$$\text{non-crystal portion (\%)} = 100 - \text{crystal portion}$$

PRIOR ART DOCUMENTS

Patent Documents

Patent Document 1: JP2-277635 A
Patent Document 2: JP9-77051 A
Patent Document 3: JP11-49940 A
Patent Document 4: JP No. 5180272

SUMMARY OF THE INVENTION

Problems to be Solved by the Invention

The laminated material for paper containers and the paper container using it proposed by the applicant are very excellent because of having a low temperature heat sealability comparable to polyethylene and moreover not adsorbing flavor, etc., represented by limonene, due to using a PET resin layer having a non-crystal portion of 85% or more at the inner surface.

However, although alcoholic drinks, such as wine and sake, various sauces, such as spaghetti sauce and tomato-processed sauce, processed tomato, and fruit juice drinks require long-term keeping quality at ordinary temperature, it could not be said that they equip sufficient long-term keeping quality therefor. That is, the oxygen barrier ability of PET resin is 60 ml/m²·25 μm·D·atm, which is superior to the oxygen barrier ability of polyethylene resin of 6,000 ml/m²·25 μm·D·atm by about 100 times, and nevertheless, it is still insufficient for the long-term keeping quality at ordinary temperature.

Besides, some system of fabricating paper containers with charging the content thereinto, require sealing in liquid, but the technique proposed by the applicant cannot be applied thereto.

The present invention has been made in order to solve the above problems, and an object of the invention is to provide a laminated material for paper containers capable of manufacturing paper containers for foods by heat-sealing which do not adsorb flavors, such as limonene, and which have long-term keeping quality at ordinary temperature, by using a PET resin layer having a low temperature heat-sealable ability comparable to polyethylene resin and not adsorbing flavors represented by limonene as the innermost layer, and by using a barrier layer having a high oxygen barrier ability as an intermediate layer.

Another object of the invention is to provide a laminated material for paper containers capable of sealing in liquid by using aluminum foil as the barrier layer.

Means for Solving Problems

The laminated material for paper containers according to claim 1 of the invention comprises paper substrate layer/adhesive for paper layer/first adhesive for barrier layer/barrier layer/second adhesive for barrier layer/heat-sealable PET resin layer, and has an oxygen gas barrier ability of 2.0 ml/m²·D·atm or less, and the heat-sealable PET resin layer has a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of } PET \text{ (26.9 KJ)}} \times 100$$ [Mathematical 1]

non-crystal portion (%) = 100 - crystal portion

The laminated material for paper containers according to claim 2 of the invention is characterized by that the barrier layer is an EVOH resin layer, a MXD-6NY resin layer, a PVDC resin layer, an inorganic material (e.g. SiOx or Al₂O₃)-deposited PET film layer or O—NY film layer or an aluminum foil.

The laminated material for paper containers according to claim 3 of the invention is characterized by that the adhesive for paper layer is a polyolefin resin layer or a PET resin layer, the first adhesive for barrier layer is a maleic anhydride-modified ethylene acrylate resin layer, and the second adhesive for barrier layer is a maleic anhydride-modified ethylene acrylate resin layer or a dry laminating adhesive layer.

The laminated material for paper containers according to claim 4 of the invention is characterized by that the heat-sealable PET resin layer is a film produced by charging PET resin having an intrinsic viscosity of 0.55-0.7 dl/g to which 0.2-2.0% of a polyfunctional chain extender having two or more epoxy groups has been added, into an extruder having two or more vent holes, degassing in a melted state of the PET resin with heating by sucking at a high vacuum of −750 mmHg or more from the vent holes, thereafter, extruding into film, and then, cooling sharply, and has a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of } PET \text{ (26.9 KJ)}} \times 100$$ [Mathematical 1]

non-crystal portion (%) = 100 - crystal portion

The laminated material for paper containers according to claim 5 of the invention is characterized by that it was formed by laminating the barrier layer and heat-sealable PET resin film by dry lamination to form a laminated material of barrier layer/heat-sealable PET resin layer, thereafter, charging PET resin having an intrinsic viscosity of 0.55-0.7 dl/g to which 0.2-2.0% of a polyfunctional chain extender having two or more epoxy groups has been added into a main extruder, degassing in a melted state of the PET resin with heating by sucking at a high vacuum of −750 mmHg or more from the vent holes, followed by introducing it into a coextrusion T die, and while charging maleic anhydride-modified ethylene acrylate resin into a subsidiary extruder, and after melted with heating, introducing it into the coextrusion T die, coextruding the PET resin and the maleic anhydride-modified ethylene acrylate resin so that the PET resin is joined to the corona-treated surface of a paper substrate layer, and the maleic anhydride-modified ethylene acrylate resin is joined to the barrier layer of the laminated material composed of the barrier layer/heat-sealable PET resin layer, and thereby, forming a laminated material composed of paper substrate layer/PET resin layer/maleic anhydride-modified ethylene acrylate resin layer/barrier layer/dry laminating adhesive layer/heat-sealable PET resin layer.

The laminated material for paper containers according to claim 6 of the invention is characterized by that it was formed by charging PET resin having an intrinsic viscosity of 0.55-0.7 dl/g to which 0.2-2.0% of a polyfunctional chain extender having two or more epoxy groups has been added into a main extruder, degassing in a melted state of the PET resin with heating by sucking at a high vacuum of −750 mmHg or more from the vent holes, followed by introducing it into a coextrusion T die, and while charging maleic anhydride-modified ethylene acrylate resin into a subsidiary extruder, and after melted with heating, introducing it into the coextrusion T die, coextruding the PET resin and the maleic anhydride-modified ethylene acrylate resin so that the maleic anhydride-modified ethylene acrylate resin is joined to the barrier layer, and while the PET resin layer is cooled sharply by a cooling roll, to form a laminated material of barrier layer/maleic anhydride-modified ethylene acrylate resin layer/heat-sealable PET resin layer, charging PET resin to which 0.2-2.0% of a polyfunctional chain extender having two or more epoxy groups has been added into a main extruder, degassing in a melted state of the PET resin with heating by sucking at a high vacuum of −750 mmHg or more from the vent holes, followed by introducing it into a coextrusion T die, and while charging maleic anhydride-modified ethylene acrylate resin into a subsidiary extruder, and after melted with heating, introducing it into the coextrusion T die, coextruding the PET resin and the maleic anhydride-modified ethylene acrylate resin so that the PET resin is joined to the corona-treated surface of a paper substrate layer, and the maleic anhydride-modified ethylene acrylate resin is joined to the barrier layer of the laminated material composed of the barrier layer/maleic anhydride-modified ethylene acrylate resin layer/heat-sealable PET resin layer, and forming a laminated material composed of paper substrate layer/PET resin layer/maleic anhydride-modified ethylene acrylate resin layer/barrier layer/maleic anhydride-modified ethylene acrylate resin layer/heat-sealable PET resin layer by the sandwich lamination, wherein the heat-sealable PET resin layer has a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

$$\text{non-crystal portion (\%)} = 100 - \text{crystal portion}$$

The laminated material for paper containers according to claim 7 of the invention is characterized by that the polyfunctional chain extender having two or more epoxy groups is styrene-methyl (metha) acrylate-glycidyl methacrylate.

The paper container according to claim 8 of the invention is characterized by using the aforementioned laminated material for paper containers, having bonded by heat sealing where the heat-sealable PET resin layer is located at the inner surface.

The paper container according to claim 9 of the invention is characterized by adding heat resistance by keeping the paper container at a temperature of 130-220° C. to raise crystal portion of the heat-sealable PET resin layer to 35% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

$$\text{non-crystal portion (\%)} = 100 - \text{crystal portion}$$

Effects of the Invention

In the laminated material for paper containers according to claim 1, since the heat-sealable PET resin layer having a non-crystal portion of 85% or more is laminated as the outermost layer which becomes inner surface upon fabricating it into a container, the container can be made by heat sealing. Moreover, since the oxygen barrier ability is 2.0 ml/m²·D·atm or less, permeation of oxygen can be made little for a long period, and thereby, long storage of even alcoholic drinks, various sauces and the like is made possible.

In the laminated material for paper containers according to claim 2, since the barrier layer is an EVOH resin layer, a MXD-6NY resin layer, a PVDC resin layer, an inorganic material (e.g. SiOx or Al₂O₃)-deposited PET film layer or O—NY film layer or an aluminum foil, oxygen barrier ability can be ensured enough. Moreover, in the case of using an aluminum foil, since the aluminum foil can be heated by applying high frequency electromagnetic field, sealing in liquid is possible.

In the laminated material for paper containers according to claim 3, since a polyolefin resin layer or a PET resin layer, a maleic anhydride-modified ethylene acrylate resin layer, a dry laminating adhesive layer are used as an adhesive layer for laminating the paper substrate layer, the barrier layer and the heat-sealable PET resin layer, the paper substrate layer, the barrier layer and the heat-sealable PET resin layer can be laminated tightly.

In the laminated material for paper containers according to claim 4, since a PET resin having an intrinsic viscosity of 0.55-0.7 dl/g is used for the heat-sealable PET resin layer, cheap recovered PET bottle flakes and PET resin for fiber can be used. Moreover, since adding 0.2-2% of a polyfunctional chain extender having two or more epoxy groups to the PET resin, charging the PET resin into an extruder having two or more vent holes, degassing in a melted state of the PET resin with heating by sucking at a high vacuum of −750 mmHg or more from the vent holes, and then extruding, it is not necessary to dry the PET resin which is usually required, and extrusion properties can be improved due to being polymerized by the chain extender. And, since the PET resin extruded into film is cooled rapidly by a cooling roll, the resulting film is rendered to have a crystal portion of less than 15% and a non-crystal portion of 85% or more represented by the following formula, to impart heat sealability.

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

$$\text{non-crystal portion (\%)} = 100 - \text{crystal portion}$$

In the laminated material for paper containers according to claim 5, since the barrier layer and the heat-sealable PET resin layer are laminated by dry lamination, lamination can be made simply. In addition, since the barrier layer and the paper substrate layer provided with corona treatment are laminated by coextruding the PET resin layer and the maleic anhydride-modified ethylene acrylate resin layer, the barrier layer is laminated tightly by the adhesiveness with the maleic anhydride-modified ethylene acrylate resin layer, and the paper substrate layer is tightly laminated integrally by the penetration of molten PET resin into the space between the fibers of paper and by the corona treatment, collectively.

In the laminated material for paper containers according to claim 6, since a PET resin having an intrinsic viscosity of 0.55-0.7 dl/g is used for the heat-sealable PET resin layer, cheap recovered PET bottle flakes and PET resin for fiber can be used. Moreover, since adding 0.2-2% of a polyfunctional chain extender having two or more epoxy groups to the PET resin, charging the PET resin into an extruder having two or more vent holes, degassing in a melted state of the PET resin with heating by sucking at a high vacuum of −750 mmHg or more from the vent holes, and then introducing into a coextrusion T die, it is not necessary to dry the PET resin which is usually required, and extrusion properties can be improved due to being polymerized by the chain extender.

In addition, since coextruding the heat-sealable PET resin layer and maleic anhydride-modified ethylene acrylate resin layer, and laminating them to the barrier layer with cooling the heat-sealable PET resin layer rapidly by the cooling roll, the PET resin layer is rendered to have a crystal portion of less than 15% and a non-crystal portion of 85% or more represented by the following formula, to impart heat sealability. Furthermore, since the maleic anhydride-modified ethylene acrylate resin is adhesive resin, it can laminate tightly the heat-sealable PET resin layer and the barrier layer integrally.

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100$$

[Mathematical 1]

non-crystal portion (%) = 100 - crystal portion

Moreover, since the barrier layer and the paper substrate layer provided with corona treatment are laminated by coextruding the PET resin layer and the maleic anhydride-modified ethylene acrylate resin layer, the barrier layer is laminated tightly by the adhesiveness with the maleic anhydride-modified ethylene acrylate resin layer, and the paper substrate layer is tightly laminated integrally by the penetration of molten PET resin into the space between the fibers of paper and by the corona treatment, collectively.

Furthermore, since respective layers of the laminated material for paper containers can be laminated by the extrusion lamination using coextrusion, it can be manufactured inexpensively at a high speed.

In the laminated material for paper containers according to claim 7, since the aforementioned polyfunctional chain extender having two or more epoxy groups is styrene-methyl (metha) acrylate-glycidyl methacrylate, it has ten epoxy groups and is a high reactivity chain extender. Therefore, it binds low molecular weight PET molecular chains rapidly to modify them into a high molecular weight PET resin, and thereby, extrusion properties can be improved.

In the paper container according to claim 8, since it is formed by using the aforementioned laminated material for paper containers and by bonding by heat sealing where the heat-sealable PET resin layer is located at the inner surface, the container can be fabricated surely by heat sealing. Moreover, it has water resistance, and it can store beverages for a long period at ordinary temperature without adsorption of flavor. Penetration of foreign material, bacteria and the like does not occur by sealing, and its safety is high.

In the paper container according to claim 9, after forming the paper container, since heat resistance has been added by keeping it at a temperature of 130-220° C. to raise crystal portion of the heat-sealable PET resin layer to 35% or more, a multifunctional microwave oven can be used therefor.

BRIEF DESCRIPTION OF THE DRAWINGS

FIG. 1 A schematic illustration of the cylinder portion of an extruder having two or more vent holes used for manufacturing the laminated material for paper containers of the invention.

FIG. 2 A drawing showing a crystallization speed of PET (insoluble catalyst).

FIG. 3 A drawing showing a structural formula of PETG, and showing that the crystallization speed is approximately zero.

FIG. 4 A perspective view of a sealing jig.

MODE FOR CARRYING OUT THE INVENTION

The laminated material for paper containers according to the invention is composed of paper substrate layer/adhesive for paper layer/first adhesive for barrier layer/barrier layer/second adhesive for barrier layer/heat-sealable PET resin layer.

In the laminated material for paper containers according to the invention, oxygen barrier ability is made 2.0 ml/m$^2$·D·atm or less, and thereby, a long period storage is made possible at ordinary temperature. Such an oxygen barrier ability is ensured mainly by the barrier layer.

Namely, the relation was investigated between the oxygen volume allowed by the shelf life for one year eatable with good-tasting for various foods and the oxygen barrier ability required for the laminated material for paper containers, on the assumption that it has permeated through the laminated material for paper containers. The results are shown in Table 1.

TABLE 1

| Food | Allowable volume of O$_2$ | O$_2$ barrier ability required for packaging material |
|---|---|---|
| Retort low acidic food | 3 ppm | 0.41 ml/m$^2$ · D · atm |
| Canned soup | 3 ppm | 0.41 ml/m$^2$ · D · atm |
| Spaghetti sauce | 3 ppm | 0.41 ml/m$^2$ · D · atm |
| Heat-sterilized beer | 2 ppm | 0.27 ml/m$^2$ · D · atm |
| Wine, Sake | 5 ppm | 0.69 ml/m$^2$ · D · atm |
| Processed tomato | 8 ppm | 1.10 ml/m$^2$ · D · atm |
| High acidic fruit juice | 20 ppm | 2.76 ml/m$^2$ · D · atm |
| Oil and shortening | 50 ppm | 6.90 ml/m$^2$ · D · atm |
| Salad dressing | 100 ppm | 13.80 ml/m$^2$ · D · atm |

The oxygen barrier ability required for the laminated material for paper containers was calculated by the following formula by using the allowable volume of oxygen and a 1 L paper container of a gable top-type (inner surface area: 665 cm$^2$).

[Mathematical 2]

Oxygen barrier ability required for packaging material $$\underset{\text{allowable volume}}{3 \text{ ppm}} \times \underset{\text{internal volume}}{1000} \times \underset{\text{conversion into volume}}{22400/(32 \times 10^6)} \times \underset{\text{conversion into m}^2}{10^4/665} \times \underset{\text{conversion per 1 day}}{1/365} \times \underset{\text{conversion into O}_2 \text{ in air}}{1/0.209} = 0.41$$

Preferable oxygen barrier layers for attaining the above oxygen barrier ability of the laminated material for paper containers, are EVOH film (oxygen barrier ability: 0.4 ml/m$^2$·D·atm, 12 μm), MXD-6NY film (oxygen barrier ability: 2 ml/m$^2$·D·atm, 20 μm), PVDC film (oxygen barrier ability: 0.9 ml/m$^2$·D·atm, 25 μm), inorganic material-deposited PET film (oxygen barrier ability: 0.5 ml/m$^2$·D·atm), or O—NY film (oxygen barrier ability: 1.5 ml/m$^2$·D·atm), Al foil (oxygen barrier ability: almost 0 ml/m$^2$·D·atm, 7 μm), and it is important to select suitable one by considering the above oxygen barrier ability required for the packaging material, and cost, etc.

Paper containers of brick type do not generate headspace, because of filling the inside by the charged liquid, but paper containers of gable top type generates headspace. Therefore, in the case of gable top type paper containers, it is necessary to replace the headspace by nitrogen gas, or to decide the oxygen barrier ability by considering the volume of oxygen existing in the headspace.

In addition, in the case of using Al foil, since sealing in liquid is possible by heating the Al foil in high frequency electromagnetic field, it is possible to apply full charging type packaging of brick type paper container which is fabricated with charging the content.

As the paper substrate layer, raw paper for cup is used for cup, and raw paper for liquid paper containers is used for paper containers of gable top type or brick type, but not limited thereto. The areal weight of the paper substrate depends on the size and form of the paper container, and it is usually 50-500 g/m$^2$, for example, 100-400 g/m$^2$ for cups, about 280 g/m$^2$ for 1 L gable top type container, and about 370 g/m$^2$ for 1.8 L gable top type container. Furthermore, the surface to be bonded by the adhesive for paper layer can be treated with various surface treatments for improving adhesiveness, such as corona treatment.

The heat-sealable PET resin layer has a crystal portion of less than 15% and a non-crystal portion of 85%, and by employing such a configuration, heat sealing can be performed at a low temperature comparable to polyethylene.

Namely, in the case of conventional PE resin or PP resin, heat sealing is conducted by raising the heat sealing temperature to higher than the melting temperature of the crystal (PE=about 110° C., PP=about 160° C.) to melt the crystals completely. If the resins to be heat-sealed are the same resins to each other, they are completely integrated, and not separated. However, in the case of PET resin, the melting point for melting the crystal is about 260° C., and to conduct heat sealing by raising the temperature thereto is not realistic, because of being too high.

While, general PET resins are produced by the polymerization of terephthalic acid and ethylene glycol. When using a glycol component consisting of 65 mol % of ethylene glycol and 35 mol % of 1.4-cyclohexane dimethanol, and polymerizing it with terephthalic acid, the resultant polymer is completely non-crystalline (see FIG. 3). It is sold as a PET group resin capable of heat sealing at 130° C. ("Eastar PETG 6763", Nagase & Co., Ltd.).

Accordingly, even in the case of general PET resins, when non-crystal portion exists in quantity, they can be integrated and not to be separated by softening and mixing of the non-crystal portion without melting crystal portion. However, crystals act as an inhibition factor to heat sealing as foreign materials, and heat sealing is sometimes not suitably performed. Thereupon, the inventors investigated eagerly as to the relationship between the non-crystal portion and the crystal portion on heat sealing, and found that, when the non-crystal portion is 85% or more and the crystal portion is less than 15%, heat sealing can be conducted excellently.

In addition, when a chain extender is added to relatively low molecular weight PET resin having an intrinsic viscosity of 0.55-0.7 dl/g, and then, formed into melted state with heating, the low molecular weight PET molecular chains are combined to form a high molecular weight PET resin having a three-dimensional structure. Therefore, viscosity, tension, etc. of molten PET resin increases to improve extrusion properties upon extrusion laminating onto the barrier layer.

Furthermore, using an extruder having two or more vent holes, when the PET resin is degassed in the melted state with heating by sucking at a high vacuum of −750 mmHg or more from the vent holes, water content, etc. can be removed by the suction. Accordingly, it is not necessary that the PET resin is previously dried.

As the chain extender to be added to such a low molecular weight PET resin, there are glycidyl acrylate, glycidyl methacrylate, styrene-methyl (metha)acrylate-glycidyl methacrylate, epoxidized soy bean oil, and the like, and preferred are polyfunctional one having at least two or more epoxy groups. The polyfunctional chain extender having two or more epoxy groups is sold by BASF Japan Ltd., Toagosei Co., Ltd. and the like, for example, "JONCRYL" (BASF Japan Ltd.), "ARUFON" (Toagosei Co., Ltd.).

A preferred amount to be added is, in general, 0.2-2.0 parts by weight per 100 parts by weight of PET resin, and it is increased or decreased according to the performance of the chain extender.

The chain extender is preferably made into a masterbatch, and then, added. The masterbatch is prepared by adding 10-50 parts by weight of the chain extender to 100 parts by weight of PET resin, and kneaded them in an extruder and then, pelletized. The masterbatch pellets are added to a prescribed amount of pellets of the PET resin, and they can be blended uniformly by mixing with stirring in a blender or the like.

The PET resin to which the chain extender has been added as above is charged into an extruder having two or more vent holes, and after degassing in a melted state of the PET resin with heating by sucking at a high vacuum of −750 mmHg or more from the vent holes, it is extruded into film or directly laminated onto the barrier layer.

A schematic illustration of the cylinder portion of an extruder having two or more vent holes is shown in FIG. 1. In FIG. 1, 1 is a cylinder, and a screw 2 is provided on the inside of the cylinder 1, and a first vent hole 3 and a second vent hole 4 are formed from the base end (on the charging side of the PET resin). In the screw 2, pressure compressing portion 21 and sealing portion 22 are arranged alternately. The sealing portion 22 seals the pressure difference between the high pressure of the back pressure at 100-200 kg/cm$^2$ in the pressure compressing portion 21 and the high vacuum of −750 mmHg at the vent hole portion 3, 4 by narrow in the channel width of the screw to fill the space by molten PET resin, and prevent blown-off of the molten resin from the vent holes 3, 4 by thrusting the resin only by the rotation of the screw 2.

The vent holes 3, 4 are connected to an oil-sealed rotary vacuum pump (not illustrated) through a condenser (not illustrated), and the condenser is provided for maintaining vacuum degree and keeping oil quality of the oil-sealed rotary vacuum pump. If the condenser is absent, for example, when PET resin having a moisture content of 3,000 ppm is operated at a discharge rate of 500 kg/hr, high vacuum cannot be maintained by the generation of a great volume of water vapor being 500,000 g×0.3/100=1,500 g/hr to denature oil of the oil-sealed rotary vacuum pump by the contamination of water.

In the extruder as above, PET resin is charged into the cylinder 1, and melt-extruded at an extrusion temperature of around 280° C., at a back pressure of 100-200 kg/cm$^2$, with degassing by sucking at a high pressure of −750 mmHg or more from the vent holes 3, 4.

The charged PET resin is, first, in the first zone, heated to melt, and kneaded with the blended chain extender. It is considered that depolymerization of the melted PET resin occurs by the hydrolysis or thermal decomposition caused by the water and heat to generate low-molecular PET chains, ethylene glycol and acetaldehyde. However, since the chain extender is blended from the first, it is considered that the low-molecular PET chains are bonded together to generate a high molecular weight with three-dimensional structure and that polymerization reaction with trapping ethylene glycol or acetaldehyde also occurs. That is, epoxy group

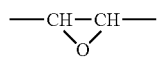

[Chemical 1]

is clove to bind to a functional group, such as carboxyl group (—COOH), aldehyde group (—CHO) or hydroxyl group (—OH), and makes PET molecular chains into a high polymer molecule having a three dimensional net structure. Further, ethylene glycol produced by depolymerization and acetaldehyde produced from ethylene glycol are trapped as a part of the high polymer molecule. Since saturated vapor pressure of the moisture contained therein is 65 kg/cm$^2$ at 280° C., the moisture is in a state of liquid at a back pressure of 100 kg/cm$^2$ or higher.

When the molten PET resin containing ethylene glycol, acetaldehyde and water reaches the first vent hole 3, ethylene glycol (b.p. 198° C.), acetaldehyde (b.p. 20° C.) and water (b.p. 100° C.) are evaporated by the high vacuum of −750 mmHg or more, and sucked to degas from the first vent hole 3. The remaining ethylene glycol, acetaldehyde and water not sucked from the first vent hole 3 are sucked to degas from the second vent hole 4.

In the second zone, it is considered that, although depolymerization also occurs partly, the polymerization reaction by the chain extender occurs mostly.

In the third zone, almost only polymerization reaction by the chain extender occurs, and PET resin, which has been rendered high molecular weight having three-dimensioned structure, is extruded. On this occasion, it is preferred that the air gap from T die is made as short as possible, and that both of the two rolls which nips to laminate are made cooling rolls. It is necessary that, at least the roll on the PET resin layer side is made a cooling roll in order to cool the PET resin layer as soon as possible. That is, since the crystallization speed of PET is fast in the range of about 130-220° C., as shown in FIG. 2, it is necessary to shorten the retention time in this temperature zone for inhibiting crystallization as little as possible. By cooling sharply, it is possible to pass this temperature zone rapidly. As a result, non-crystal portion of the PET resin can be made 85% or more.

As to cooling rolls, it is preferred that, at least the roll on the PET resin layer side is a metal roll wherein cooling water runs.

A preferable thickness of the heat-sealable PET resin layer is 10-50 μm, more preferably 20-40 μm. When the thickness is less than 10 μm, it is difficult to fill gaps generated by irregularity, etc. of the entire laminated material with molten resin. As a result, heat sealing is tend to be incomplete. Whereas, the thickness exceeding 50 μm brings only increase in cost.

The lamination between the heat-sealable PET resin layer and the barrier layer is carried out through the second adhesive for barrier layer. As the actual lamination method, there are the lamination by the dry lamination and the lamination by the coextrusion of the heat-sealable PET resin layer and the second adhesive for barrier layer. The dry lamination method is relatively simple, whereas the lamination method by coextrusion can laminate more tightly.

The adhesive for the dry lamination may be either of a two-part adhesive composed of a polyester-based main agent and isocyanate curing agent or a two-part adhesive composed of a polyether-based main agent and isocyanate curing agent. However, although there are aliphatic isocyanates represented by isophorone-diisocyate (IPDI) and aromatic isocyanates represented by toluene diisocyanate (TDI), the use of TDI has been prohibited by FDA in USA because it is possible to convert into toluene diamine having carcinogenicity by the hydrolysis during retort sterilization. Accordingly, aliphatic isocyanates are used because of no risk of carcinogenicity, although the curing speed is slower than aromatic isocyanates.

In the laminating method according to the coextrusion of the heat-sealable PET resin layer and the second adhesive for barrier layer, it is preferred to use a maleic anhydride-modified ethylene acrylate resin layer as the second adhesive for barrier layer. In the maleic anhydride-modified ethylene acrylate resin, the ring of maleic anhydride portion opens to form carboxyl group, and the carboxyl group binds to a hydrophilic polar group in EVOH resin, MXD-6NY resin, PVDC resin, PET resin of the barrier layer to adhere tightly. In the case of the inorganic material (e.g. SiOx or Al$_2$O$_3$)-deposited film layer or aluminum foil, for example, in the case of aluminum foil, the oxide layer (Al$_2$O$_3$) formed on the surface binds to the carboxyl group through hydrogen bond to adhere tightly. As mentioned above, since adhered tightly to PET resin, it is also adhered to the heat-sealable PET resin layer tightly.

When the aforementioned barrier layer (barrier layer/dry laminating adhesive layer/heat-sealable PET resin layer or barrier layer/maleic anhydride-modified ethylene acrylate resin layer/heat-sealable PET resin layer) is laminated to the paper substrate layer, the lamination is conducted by the coextension of the PET resin layer (adhesive for paper layer) and the maleic anhydride-modified ethylene acrylate resin layer (first adhesive for barrier layer). That is, the extrusion lamination is conducted by that the PET resin layer and the maleic anhydride-modified ethylene acrylate resin layer are coextruded between the barrier layer and the paper substrate layer so that the PET resin layer is disposed on the paper substrate layer side and the maleic anhydride-modified ethylene acrylate resin layer is disposed on the barrier layer side. The adhesion surface of the paper substrate layer has been provided with corona treatment.

The PET resin layer is strongly laminated to the paper substrate layer by penetrating the PET resin layer into the space between fibers of the paper substrate layer. As the adhesive for paper layer, the polyolefin resin layer can also be used because of exhibiting similar functions, other than the PET resin layer. Illustrative of the polyolefin resin are LDPE resin, LLDPE resin, HDPE resin, and PP resin. Since the ethylene portion of maleic anhydride-modified ethylene acrylate is in the same type as the ethylene portion of polyolefin resin, the maleic anhydride-modified ethylene acrylate resin layer is integrated with the polyolefin resin layer and laminated tightly each other upon laminating.

Upon fabricating a paper container using the laminated material for paper containers as above, it is conducted by disposing the heat-sealable PET resin layer as the inner surface layer and then heat sealing. Although in some container-fabricating machines, heating of the heat sealing surface is made directly by flame or hot air, in many container-fabricating machines, heat sealing is commonly carried out by heating using a hot plate. In this case, heating is conducted from the paper layer side being an insulating material by the hot plate, it is important from the productivity viewpoint that the heat sealing temperature is a low temperature comparable to polyethylene.

In the case of the laminated material for paper containers using aluminum foil as the barrier layer, it is possible to employ the method of fabricating paper containers with charging (sealing in liquid), where the content is charged with rounding the laminated material for paper containers to make a cylinder, and the portions to be formed into the bottom portion and the top portion are heat-sealed by heating the aluminum foil layer of the above portions by a jig which generates high frequency electromagnetic field. In this case, since heat sealing is performed in the state that the liquid content exists on the sealing surface, lower heat sealing temperature is preferred.

The paper containers are made by punching the laminated material for paper containers into the blank of the paper container to be formed, and fabricating it into a gable top type container, a brick type container or a cup by each exclusive fabricating machine. Illustrative of the contents are beverages such as vegetable juice, milk, yogurt, Japanese tea and coffee, alcoholic drinks, such as sake and Japanese spirits, liquid seasonings, such as sauce for noodles and soy sauce, cups, such as for instant noodles and for ice cream, and the like.

As to the paper containers for the beverages and of cups not requiring heat resistance, the fabricated containers can be used as it is. However, the containers for multifunctional microwave ovens are necessary further to impart heat resistance. The heat resistance at 200° C. or more can be imparted by keeping the fabricated paper containers at 130-220° C. in a temperature-controlled chamber to render the crystal portion of the PET resin layer (the adhesive for paper layer, the heat-sealable PET resin layer) 35% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

non-crystal portion (%) = 100- crystal portion

FIG. 2 represents a crystallization speed of PET (insoluble catalyst), and abscissa indicates crystallization temperature and ordinate indicates half crystallization time. From the figure, it can be seen that optimum crystallization temperature is at 130-220° C. That is, crystallization speed is decreased due to small freedom of molecule at a temperature lower than 130° C. and to small driving force for crystallization at a temperature higher than 220° C.

Examples 1

Preparation of Heat-Sealable PET Resin Film 100 parts by weight of PET resin manufactured by Unitika Ltd. "MA-2101M" (intrinsic viscosity: 0.62 dl/g, moisture content: 2,900 ppm) and 1.5 parts by weight of a masterbatch of PET containing 30% by weight of chain extender "ADR 4368" manufactured by BASF Japan Ltd. were mixed with stirring by a Henschel mixer. The mixed resin was charged into a twin-screw extruder wherein screws rotating in the same direction "HMT 100" manufactured by Hitachi Zosen Corp. (L/D=38, discharge: 650/kg/hr, 2 vent holes), and extruded at an extrusion temperature of 280° C. with sucking to degas under a high vacuum of −755 mmHg from the vent holes to form a film 35 μm in thickness.

Cooling water at 25° C. was introduced into the cooling roll, and the vent holes were connected to an oil-sealed rotary vacuum pump through a condenser. Air gap was set at 12 cm, and a heat-sealable PET film was manufactured at a processing speed of 40 m/min.

<Behavior of Moisture>

The screw and the suction with vacuum in continuous extrusion at a processing speed of 40 m/min, were temporarily stopped, and resins located at the position of the first vent hole and the second vent hole of the extruder were taken as samples. The moisture contents of them were measured by using a moisture vaporizer for plastics "ADP-351 type" (manufactured by Kyoto Electronics Manufacturing Co., Ltd.) and a Karl Fischer moisture meter "MKC-210 type" (manufactured by Kyoto Electronics Manufacturing Co., Ltd.), and the results are shown in Table 2.

TABLE 2

| PET resin | Position | | |
|---|---|---|---|
| | Before charging | First vent hole | Second vent hole |
| MA-2101M | 2,850 ppm | 7 ppm | 0 ppm |

The moisture content of the undried PET resin were decreased to 10 ppm or less at the position of the first vent hole which passes the criterion of 50 ppm or less required upon the extrusion of conventional PET resins. At the position of the second vent hole, the moisture content became 0 ppm, and it can be seen that previous drying does not need because of sucking to degas from the vent holes.

<Residual Acetaldehyde>

The heat-sealable PET film prepared as above was cut into a size of 1 cm×2 cm, and a large number of the cut pieces corresponding to surface area of 250 $cm^2$ in total of the inside and the outside were placed in a 500 ml Erlenmeyer glass flask with a ground stopper.

Then, after replacing the air in the Erlenmeyer flask by $N_2$ gas at 40° C. (2 ml $N_2$ gas/1 $cm^2$ surface area) in a room at 40° C., the flask was sealed by the ground stopper, and allowed to stand at 40° C. for 24 hours. As to the vapor phase in the Erlenmeyer flask treated as above, presence of foreign odor was judged by 5 members of odor panel, and acetaldehyde in the vapor phase was measured by the gas chromatograph manufactured by Shimazu Corporation, "GC-6A type" with a FID detector, the results are shown in Tables 3 and 4.

TABLE 3

| Odor Test by Panel Members | |
|---|---|
| Panel members | Presence of foreign odor |
| 5 members | All 5 members did not feel foreign odor. |

TABLE 4

| Detection of Acetaldehyde by the Gas Chromatograph | |
|---|---|
| Sample | Quantity of acetaldehyde |
| Vapor phase in the Erlenmeyer flask | 0 μg/l |

Foreign odor was not felt in the odor test by panel members, and acetaldehyde was not detected by the gas chromatograph. Accordingly, it was confirmed that residual acetaldehyde was not present.

<Evaluation of Flavor Adsorption>

The heat-sealable PET film prepared as above was cut into a size of 5 cm×10 cm, and 5 pieces thereof (250 cm² in total) were immersed in 100% d-limonene liquid which is a principal flavor component of citrus fruits, and allowed to stand in a temperature-controlled chamber at 23° C.

The film pieces were taken out after 1 day and after 7 days, and the d-limonene liquid on the surface was rapidly wiped off by a filter paper, and the weight was measured to determine the weight increase caused by the adsorption of d-limonene into the film. Simultaneously, LDPE resin film 30 μm in thickness was cut into the same size, and measured similarly. The results are shown in Table 5.

TABLE 5

| Resin | No. of immersed days | |
|---|---|---|
|  | 1 day | 7 days |
| PET film | 0.1% | 0.2% |
| LDPE film | 5.9% | 6.7% |

It can be seen that the weight increase of the PET film is much small compared with the weight increase of the LDPE resin film by the adsorption, and therefore, the PET film dose not adsorb the flavor.

<Rate of Heat-Sealable Non-Crystal Portion>

The heat-sealable PET film prepared as above was heat treated by allowing it to stand in a temperature-controlled chamber at 170° C., and thereby, samples having different non-crystal portions were prepared. The melt behavior of the non-crystal portion was measured by a differential scanning calorimeter of Seico Electronics Industrial Co., Ltd. "DSC 220" to determine the rate of crystal portion based on the undermentioned formula, and the rate of non-crystal portion was calculated by non-crystal portion (%)=100−crystal portion (%).

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 3]}$$

The results are shown in Table 6.

TABLE 6

| Heating time (min.) | 0 | 1 | 2 | 3 | 5 |
|---|---|---|---|---|---|
| Non-crystal portion (%) | 89.8 | 87.3 | 85.1 | 82.7 | 74.7 |

Subsequently, the heat-treated films were superimposed to each other, and heat-sealed. The heat seal was carried out according to JIS Z-1707, at a pressure of 0.2 MPa for a sealing time of one second. The result of heat seal strength are shown in Table 7.

TABLE 7

| Non-crystal | Sealing temp. | | | | unit g/15 mm width |
|---|---|---|---|---|---|
| portion (%) | 120° C. | 140° C. | 170° C. | 200° C. | 230° C. |
| 89.8% | 470 | 750 | 1600 | unpeelable (rupture) | unpeelable (rupture) |
| 87.3% | 460 | 570 | 900 | unpeelable (rupture) | unpeelable (rupture) |
| 85.1% | 380 | 460 | 690 | 810 | 1800 |
| 82.7% | x | x | x | x | 1400 |
| 74.7% | x | x | x | x | 1100 | x: not heat-sealable

From Table 7, it can be seen that when the rate of non-crystal portion exceeds 85%, heat seal strength comparable to PE resin can be obtained.

[Barrie Layer]

As the barrier layer, EVOH film ("EVAL EF-XL Film", 12 μm, manufactured by Kuraray Trading Co., Ltd.) was used.

[Lamination of Barrier Layer and Heat-Sealable PET Film]

A gravure roll having a screen ruling of 95 lines formed by helio engraving was set on a dry laminating machine "XL-3" of Nakajima Seiki Engineering Corp., an urethane adhesive manufactured by Toyo Morton Ltd. (main agent: TM-569, curing agent: CAT-RT37, solvent: ethyl acetate ester) was applied onto the EVOH film at an applying speed of 28 m/min., and dried in three zones at a hot air temperature of 40° C., 65° C., 55° C. Then, it was laminated to the aforementioned heat-sealable PET film, and aged in a thermostat chamber at 46° C. for three days to produce a laminated material of EVOH resin layer (12 μm)/urethane adhesive layer/heat-sealable PET resin layer (35 μm).

[Paper Substrate Layer]

As the paper substrate layer, a paper substrate of 250 g/m² was used. Corona treatment was provided on one side (the face becoming inside upon fabricating into container) of the paper substrate.

[Preparation of Laminated Material for Paper Containers]

100 parts by weight of PET resin manufactured by Unitika Ltd. "MA-2101M" (intrinsic viscosity: 0.62 dl/g, moisture content: 2,850 ppm) and 1.5 parts by weight of a masterbatch of PET containing 30% by weight of chain extender "ADR 4368" manufactured by BASF Japan Ltd. were mixed with stirring by a Henschel mixer. The mixed resin was charged into the main extruder which was a twin-screw extruder wherein screws rotating in the same direction "HMT 100" manufactured by Hitachi Zosen Corp. (L/D=38, discharge: 650/kg/hr, 2 vent holes), and after sucking to degas under a high vacuum of −755 mmHg from the vent holes at an extrusion temperature of 280° C., it was introduced into a coextrusion T die. Maleic anhydride-modified ethylene acrylate resin "Fusabond (registered trademark) 21E830" manufactured by Dupont was charged into a subsidiary extruder which was a twin-screw extruder wherein screws rotating in the same direction "HMT 57" manufactured by Hitachi Zosen Corp. (L/D=36, discharge: 200 kg/hr, 2 vent holes), and after sucking to degas under a high vacuum of −755 mmHg from the vent holes at an extrusion temperature of 280° C., it was introduced into the coextrusion T die.

Then, PET resin layer (20 μm) and maleic anhydride-modified ethylene acrylate resin layer (10 μm) were coextruded from the coextrusion T die, into between the above laminated material (EVOH layer (12 μm)/urethane adhesive layer/heat-sealable PET resin layer (35 μm)) and the paper substrate layer (250 g/m²), so that the PET resin layer adheres to the corona-treated surface of the paper substrate layer and the maleic anhydride-modified ethylene acrylate resin layer adheres to the EVOH layer, to laminate them by extrusion laminating, and thereby, a laminated material for paper containers was prepared composed of paper substrate layer (250 g/m²)/PET resin layer (20 μm)/maleic anhydride-modified ethylene acrylate resin layer (10 μm)/EVOH layer (12 μm)/urethane adhesive layer/heat-sealable PET resin layer (35 μm). Processing speed was set at 130 m/min.

<Oxygen Gas Barrier Ability>

The oxygen gas barrier ability of the prepared laminated material for paper containers was measured using an oxygen permeability measuring device "OX-TRAN (registered trademark) MODEL 2/21" manufactured by MOCON (registered trademark) Co., under conditions at a temperature of 30° C. and a humidity of 65% RH. The result is shown in Table 8.

TABLE 8

| | Oxygen gas barrier ability |
|---|---|
| Laminate material for paper containers | 0.6 ml/m² · d · atm |

The oxygen barrier ability is excellent, and it is possible to store various alcoholic drinks, various sauces, processed tomato, various fruit juice drinks and the like at ordinary temperature for a long period.

[Preparation of Paper Container]

One liter gable top type paper containers were manufactured by using a gable top type container-fabricating machine. They could be manufactured under the conditions almost similar to those used a laminated material for paper containers containing a conventional PE resin layer as the heat sealing layer.

Examples 2

Lamination of Barrier Layer and Heat-Sealable PET Film 100 parts by weight of PET resin manufactured by Unitika Ltd. "MA-2101M" (intrinsic viscosity: 0.62 dl/g, moisture content: 2,850 ppm) and 1.5 parts by weight of a masterbatch of PET containing 30% by weight of chain extender "ADR 4368" manufactured by BASF Japan Ltd. were mixed with stirring by a Henschel mixer. The mixed resin was charged into the main extruder which was a twin-screw extruder wherein screws rotating in the same direction "HMT 100" manufactured by Hitachi Zosen Corp. (L/D=38, discharge: 650/kg/hr, 2 vent holes), and after sucking to degas under a high vacuum of −755 mmHg from the vent holes at an extrusion temperature of 280° C., it was introduced into a coextrusion T die. Maleic anhydride-modified ethylene acrylate resin ("Fusabond (registered trademark) 21E830" manufactured by Dupont) was charged into a subsidiary extruder which was a twin-screw extruder wherein screws rotating in the same direction "HMT 57" manufactured by Hitachi Zosen Corp. (L/D=36, discharge: 200 kg/hr, 2 vent holes), and after sucking to degas under a high vacuum of −755 mmHg from the vent holes at an extrusion temperature of 280° C., it was introduced into the coextrusion T die.

Then, PET resin layer and maleic anhydride-modified ethylene acrylate resin layer were coextruded from the coextrusion T die, and laminated so that the maleic anhydride-modified ethylene acrylate resin layer is adhered to the surface of Al foil "Super Foil" (7 μm) manufactured by Toyo Aluminum Co., Ltd. to prepare a laminated material composed of Al foil layer (7 μm)/maleic anhydride-modified ethylene acrylate resin layer (10 μm)/heat-sealable PET resin layer (30 μm). Cooling water at 25° C. was introduced into the cooling roll, and the vent holes were connected to an oil-sealed rotary vacuum pump through a condenser. Air gap was set at 12 cm, and the lamination was conducted at a processing speed of 130 m/min.

[Preparation of Laminated Material for Paper Containers]

Subsequently, 100 parts by weight of PET resin manufactured by Unitika Ltd. "MA-2101M" (intrinsic viscosity: 0.62 dl/g, moisture content: 2,850 ppm) and 1.5 parts by weight of a masterbatch of PET containing 30% by weight of chain extender "ADR 4368" manufactured by BASF Japan Ltd. were mixed with stirring by a Henschel mixer. The mixed resin was charged into the main extruder which was a twin-screw extruder wherein screws rotating in the same direction "HMT 100" manufactured by Hitachi Zosen Corp. (L/D=38, discharge: 650/kg/hr, 2 vent holes), and after sucking to degas under a high vacuum of −755 mmHg from the vent holes at an extrusion temperature of 280° C., it was introduced into a coextrusion T die. Maleic anhydride-modified ethylene acrylate resin "Fusabond (registered trademark) 21E830" manufactured by Dupont was charged into a subsidiary extruder which was a twin-screw extruder wherein screws rotating in the same direction "HMT 57" manufactured by Hitachi Zosen Corp. (L/D=36, discharge: 200 kg/hr, 2 vent holes), and after sucking to degas under a high vacuum of −755 mmHg from the vent holes at an extrusion temperature of 280° C., it was introduced into the coextrusion T die.

Then, PET resin layer (20 μm) and maleic anhydride-modified ethylene acrylate resin layer (10 μm) were coextruded from the coextrusion T die, into between the above laminated material (Al foil layer (7 μm)/maleic anhydride-modified ethylene acrylate resin layer (10 μm)/heat-sealable PET resin layer (30 μm)) and the paper substrate layer, so that the PET resin layer adheres to the corona-treated surface of the paper substrate layer and the maleic anhydride-modified ethylene acrylate resin layer adheres to the Al foil layer, to laminate them, and thereby, a laminated material for paper containers was prepared composed of paper substrate layer (250 g/m²/PET resin layer (20 μm)/maleic anhydride-modified ethylene acrylate resin layer (10 μm)/Al foil layer (7 μm)/maleic anhydride-modified ethylene acrylate resin layer (10 μm)/heat-sealable PET resin layer (30 μm). Processing speed was set at 130 m/min.

<Oxygen Gas Barrier Ability>

The prepared laminated material for paper containers was measured using an oxygen permeability measuring device "OX-TRAN (registered trademark) MODEL2/21" manufactured by MOCON (registered trademark) Co., under conditions at a temperature of 30° C. and a humidity of 65% RH. The result is shown in Table 9.

TABLE 9

| | Oxygen gas barrier ability |
|---|---|
| Laminate material for paper containers | 0.2 ml/m² · d · atm |

The oxygen barrier ability is excellent, and it is possible to store various alcoholic drinks, various sauces, processed tomato, various fruit juice drinks and the like at ordinary temperature for a long period.

<Sealing in Liquid Test>

A sealing jig as shown in FIG. 4 was made. In FIG. 4, the sealing jig 30 is formed by engineering nylon in a form of inverted T-shape in section, and a U-shaped high-frequency heating coil 31 is embedded therein. The high-frequency heating coil 31 is connected to a high-frequency power source. In the sealing jig 30, electromagnetic field is generated around the heating coil 31 by supplying alternating current to generate a high density eddy current in the vicinity of an electrical conductor (Al foil layer), and the Al foil layer is heated by the Joule heat.

The prepared laminated material for paper containers was slit into a width of 18 cm, and cut into a length of 40 cm. The cut laminated material for paper containers was rounded so that the surface of the heat-sealable PET resin layer was disposed on the inside, both ends were superimposed and heat-sealed in a width of 5 mm to prepare a cylinder having a diameter of about 5.5 cm. One end of the cylinder was nipped between two sealing jigs 30, and heat-sealed by applying electric current for 0.7 second, to close the end of the cylindrical laminated material for paper containers. Subsequently, water was charged into the cylindrical laminated material for paper containers, and it was nipped between the sealing jigs 30 so that the surfaces of the heat-sealable PET resin layer of the laminated material for paper containers were met in the charged water, and sealing in liquid was conducted by applying electric current for 0.9 second. This operation was repeated three times continuously to prepare a continuous body composed of three containers connected in a row. The continuous body was cut off at the central portion of each of the sealed portion in liquid to prepare three containers.

Water leakage of the three containers were observed, but leakage of water did not find. The seal strength of the sealed portion in liquid was measured, and the results are shown in Table 10. The heat seal was carried out according to JIS Z-1707.

TABLE 10

|  | unit g/15 mm width | |
| --- | --- | --- |
|  | Sealed potion | Average |
| Sealed portion in liquid | 850, 780, 810 | 813 |

They have a sufficient heat seal strength, and it is considered that separation does not occur by dropping or the like.

<Preparation of Paper Container>

Using the laminated material for paper containers, 300 ml gable top type paper containers ware manufactured by using a gable top type container-fabricating machine. They could be manufactured under the conditions almost similar to those using a laminated material for paper containers containing a conventional PET resin layer.

| Description of Reference Signs | |
| --- | --- |
| 1 | Cylinder |
| 2 | Screw |
| 3 | First vent hole |
| 4 | Second vent hole |
| 30 | Sealing jig |
| 31 | High-frequency heating coil |

The invention claimed is:

1. A laminated material for paper containers which comprises paper substrate layer/adhesive for paper layer/first adhesive for barrier layer/barrier layer/second adhesive for barrier layer/heat-sealable polyethylene terephthalate (PET) resin layer, and has an oxygen gas barrier ability of 2.0 ml/m²·D·atm or less as measured by ASTM D 3985-81, and the heat-sealable PET resin layer has a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

non-crystal portion (%) = 100 - crystal portion;

and
wherein said adhesive for paper layer is a PET resin layer, wherein said first adhesive for barrier layer is a maleic anhydride-modified ethylene acrylate resin layer, and wherein said second adhesive for barrier layer is a dry laminating adhesive layer.

2. The laminated material for paper containers as set forth in claim 1, wherein said barrier layer is an ethylene vinyl alcohol copolymer (EVOH) resin layer, a poly[imino(1,6-dioxohexamethylene)-iminomethylene-1,3-phenylenemethylene (MXD-6NY) resin layer, a polyvinylidene chloride (PVDC) resin layer, an inorganic material-deposited PET film layer or oriented nylon (O-NY) film layer or an aluminum foil, wherein said inorganic material includes SiO, $SiO_2$ or $Al_2O_3$.

3. The laminated material for paper containers as set forth in claim 1, wherein said heat-sealable PET resin layer is a film produced by charging PET resin having an intrinsic viscosity of 0.55-0.7 dl/g to which 0.2-2.0% of a polyfunctional chain extender having two or more epoxy groups has been added, into an extruder having two or more vent holes, degassing in a melted state of the PET resin with heating by sucking at a high vacuum of −750 mmHg or more from the vent holes, thereafter, extruding into film, and then, cooling sharply, and has a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \quad \text{[Mathematical 1]}$$

non-crystal portion (%) = 100 - crystal portion.

4. The laminated material for paper containers as set forth in claim 1, which was formed by laminating said barrier layer and heat-sealable PET resin film by dry lamination to form a laminated material of barrier layer/heat-sealable PET resin layer, thereafter, charging PET resin having an intrinsic viscosity of 0.55-0.7 dl/g to which 0.2-2.0% of a polyfunctional chain extender having two or more epoxy groups had been added, into a main extruder, degassing in a melted state of the PET rein with heating by sucking at a high vacuum of −750 mmHg or more from the vent holes, followed by introducing it into a coextrusion T die, and while charging maleic anhydride-modified ethylene acrylate resin into a subsidiary extruder, and after melted with heating, introducing it into the coextrusion T die, coextruding the PET resin layer and the maleic anhydride-modified ethylene acrylate resin layer so that the PET resin layer is joined to the corona-treated surface of a paper substrate layer, and the maleic anhydride-modified ethylene acrylate resin layer is jointed to the barrier layer of the laminated material composed of the barrier layer/heat-sealable PET resin layer, and thereby, forming a laminated material composed of paper substrate layer/PET resin layer/maleic anhydride-modified ethylene acrylate resin layer/barrier layer/dry laminating adhesive layer/heat-sealable PET resin layer.

5. The laminated material for paper containers as set forth in claim 1, which was formed by charging PET resin having an intrinsic viscosity of 0.55-0.7 dl/g to which 0.2-2.0% of a polyfunctional chain extender having two or more epoxy groups had been added, into a main extruder, degassing in a melted state of the PET rein with heating by sucking at a high vacuum of −750 mmHg or more from the vent holes, followed by introducing it into a coextrusion T die, and while charging maleic anhydride-modified ethylene acrylate resin into a subsidiary extruder, and after melted with heating, introducing it into the coextrusion T die, coextruding the PET resin layer and the maleic anhydride-modified ethylene acrylate resin layer so that the maleic anhydride-modified ethylene acrylate resin layer is joined to the barrier layer, and while the PET resin layer is cooled sharply by a cooling roll, to form a laminated material of barrier layer/maleic anhydride-modified ethylene acrylate resin layer/heat-sealable PET resin layer, charging PET resin to which 0.2-2.0% of a polyfunctional chain extender having two or more epoxy groups had been added, into a main extruder, degassing in a melted state of the PET rein with heating by sucking at a high vacuum of −750 mmHg or more from the vent holes, followed by introducing it into a coextrusion T die, and while charging maleic anhydride-modified ethylene acrylate resin into a subsidiary extruder, and after melted with heating, introducing it into the coextrusion T die, coextruding the PET resin layer and the maleic anhydride-modified ethylene acrylate resin layer so that the PET resin layer is joined to the corona-treated surface of a paper substrate layer, and the maleic anhydride-modified ethylene acrylate resin layer is jointed to the barrier layer of the laminated material composed of the barrier layer/maleic anhydride-modified ethylene acrylate resin layer/heat-sealable PET resin layer, and forming a laminated material composed of paper substrate layer/PET resin layer/maleic anhydride-modified ethylene acrylate resin layer/barrier layer/maleic anhydride-modified ethylene acrylate resin layer/heat-sealable PET resin layer, wherein the heat-sealable PET resin layer had a crystal portion of less than 15% and a non-crystal portion of 85% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of } PET \text{ (26.9 KJ)}} \times 100 \quad \text{[Mathematical 1]}$$

non-crystal portion (%) = 100 − crystal portion.

6. The laminated material for paper containers as set forth in claim 4, wherein said polyfunctional chain extender having two or more epoxy groups is styrene-methyl (metha) acrylate-glycidyl methacrylate.

7. A paper container formed by using the laminated material for paper containers as set forth in claim 1, being bonded by heat sealing where the heat-sealable PET resin layer is located at the inner surface.

8. A paper container to which heat resistance has been added by keeping the paper container as set forth in claim 7 at a temperature of 130-220° C. to raise the crystal portion of the heat-sealable PET resin layer to 35% or more represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of } PET \text{ (26.9 KJ)}} \times 100 \quad \text{[Mathematical 1]}$$

non-crystal portion (%) = 100 − crystal portion.

9. The laminated material for paper containers as set forth in claim 5, wherein said polyfunctional chain extender having two or more epoxy groups is styrene-methyl (metha) acrylate-glycidyl methacrylate.

* * * * *